United States Patent [19]

Anderson

[11] Patent Number: 5,066,845
[45] Date of Patent: Nov. 19, 1991

[54] RESISTANCE WELDING ELECTRODE COATED WITH CERAMIC LAYER

[75] Inventor: Stephen L. Anderson, Traverse City, Mich.

[73] Assignee: Alcotec Wire Company, Traverse City, Mich.

[21] Appl. No.: 563,377

[22] Filed: Aug. 6, 1990

Related U.S. Application Data

[63] Continuation-in-part of Ser. No. 405,868, Sep. 11, 1989, Pat. No. 4,947,024.

[51] Int. Cl.$^5$ .............................................. B23K 9/24
[52] U.S. Cl. .................................... 219/119; 219/120; 219/117.1
[58] Field of Search ...................... 219/119, 120, 117.1

[56] References Cited

U.S. PATENT DOCUMENTS

| | | | |
|---|---|---|---|
| 2,431,334 | 11/1947 | Lambert | 219/4 |
| 3,665,145 | 5/1972 | Engel | 219/119 |
| 4,044,220 | 8/1977 | Glagola | 219/119 |
| 4,514,612 | 4/1985 | Nied | 219/119 |
| 4,843,206 | 6/1989 | Azuma et al. | 219/119 |
| 4,861,961 | 8/1989 | Huys | 219/119 |

Primary Examiner—Marvin M. Lateef
Attorney, Agent, or Firm—Glenn E. Klepac

[57] ABSTRACT

An outer surface of a resistance welding electrode tip is coated with a layer of an electrically conductive ceramic material. A preferred layer contains tungsten disulfide applied by chemical vapor deposition.

16 Claims, 1 Drawing Sheet

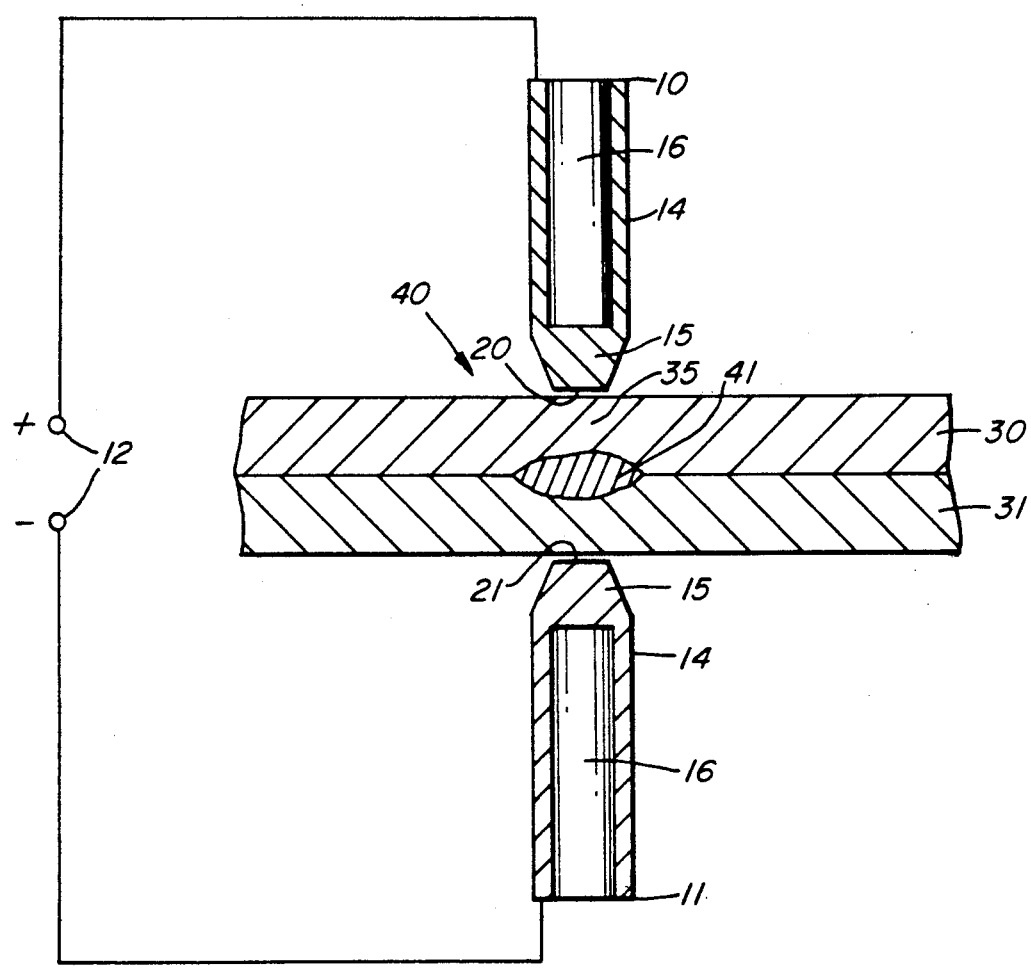

RESISTANCE WELDING ELECTRODE COATED WITH CERAMIC LAYER

PENDING RELATED APPLICATION

This application is a continuation-in-part of U.S. Ser. No. 405,868 filed Sept. 11, 1989, now U.S. Pat. No. 4,947,024 issued Aug. 7,1990.

FIELD OF THE INVENTION

The present invention relates to electrodes used in electric resistance welding. The electrode of the invention has a tip that is coated with a layer of a ceramic material which prevents workpiece metal from sticking to the tip and thereby extends useful life of the electrode.

BACKGROUND OF THE INVENTION

Resistance welding electrodes are widely used in industry for spot welding steel, aluminum, copper, and various other metals. Some particular applications are the assembly of automobile bodies, truck bodies, and railroad car bodies. In each of these uses, a welding gun fitted with a pair of electrodes is moved in stages along a continuous weld path. At each stage, the electrodes are contacted with opposite sides of the workpieces to be welded, and an electric current is passed through the electrodes and workpieces. Electrical resistance of the metals produces localized heating which causes the workpieces to fuse at a weld site. The electrodes are then removed, and the workpieces are allowed to cool. To prevent the electrodes from softening and melting, cooling water is continuously circulated through them. When performed on a production line, these steps are each performed in rapid sequence and they are repeated at several different weld locations.

Conventional resistance welding electrodes are generally made from copper or copper alloys for low electrical resistivity and high current flow. The copper electrodes generally perform satisfactorily for a time, but they deteriorate rapidly when metal from the workpieces sticks to them. This phenomenon is called electrode "pick-up". Distortion in shape of the electrodes (called "mushrooming") may also pose a problem.

Some coatings aimed at overcoming the above-described problems have been developed in the prior art. For example, Huys U.S. Pat. No. 4,861,961 claims a welding electrode coated with titanium carbide. A tungsten carbide coating is also mentioned.

Lambert U.S. Pat. No. 2,431,334 discloses a welding electrode comprising a tungsten rod coated with tungsten carbide.

Engel U.S. Pat. No. 3,665,145 and Glagola U.S. Pat. No. 4,044,220 both disclose welding electrodes coated with nickel, beryllium, cobalt, iron, and alloys of such metals. Engel and Glagola did not suggest coating their welding electrodes with non-metals It is a principal objective of the present invention to provide a coating for a resistance welding electrode tip comprising a layer of an electrically conductive ceramic material.

A related objective of the present invention is to coat a resistance welding electrode tip with a layer that preferably comprises tungsten disulfide.

A further objective of the invention is to provide a welding process utilizing a resistance welding electrode having a tip coated with an electrically conductive ceramic material.

Additional objectives and advantages of the present invention will become apparent to persons skilled in the art from the following detailed description.

SUMMARY OF THE INVENTION

In accordance with the present invention, there is provided a resistance welding electrode comprising a metal body defining a tip having an outer surface. The metal body preferably comprises copper or a copper alloy.

In order to prevent metal pick-up on the welding tip during use, the outer surface is coated with a layer of a ceramic material. The ceramic material may be selected from the group consisting of a sulfide of tungsten, titanium, molybdenum, and zirconium; a silicide of tantalum or vanadium; and a boride of hafnium, titanium, vanadium, and zirconium. Preferably, the ceramic material may be selected from the group consisting of disulfides of tungsten, titanium, molybdenum, and zirconium; disilicides of tantalum and vanadium; and diborides of hafnium, titanium, vanadium, and zirconium. Some particularly suitable ceramic materials are tungsten disulfide, molybdenum disulfide, and titanium disulfide.

The layer of ceramic material should have sufficient electrical conductivity to allow passage of electric current. Preferably, the layer has an electrical resistivity of about 16 microohm-cm or less at ambient temperature, more preferably about 10 microohm-cm or less. The layer should also have a thermal conductivity of greater than about 0.05 cal/cm-sec° C. at ambient temperature.

The layer of ceramic material should have a thickness of about 5000 angstroms or less, preferably about 500–2000 angstroms. In a preferred embodiment, a tungsten disulfide layer is applied to the outer surface of the welding tip by chemical vapor deposition.

BRIEF DESCRIPTION OF THE DRAWING

The sole Figure is a schematic illustration of a resistance welding apparatus having electrode tips coated with a layer of ceramic material in accordance with the present invention.

DETAILED DESCRIPTION OF A PREFERRED EMBODIMENT

There is shown in the Figure a preferred resistance welding apparatus made in accordance with the invention. The apparatus comprises opposed copper electrodes 10, 11 and an electric power supply 12.

The electrodes 10, 11 each define a tip or contact tip 15 and a hollow cavity 16. The tips 15 have outer surfaces 20, 21 abutting against a first metal workpiece 30 and a second metal workpiece 31. In the preferred embodiment illustrated, the workpieces 30, 31 are each formed from a 5052 (Aluminum Association series) aluminum alloy. The workpieces 30, 31 may also be made from steel, iron, copper or various other metals.

The workpieces 30, 31 are brought together so that they abut in a weld region 35. After an electric current passes through the electrodes 10, 11 and workpieces 30, 31 in the weld region 35, the workpieces 30, 31 fuse together to form a weldment 40.

The weldment 40 is characterized by a weld site or weld nugget 41 as shown in the Figure. The weld site 41 is formed by melting and subsequent fusion of portions of the workpieces 30, 31. The weld site 41 typically has a thickness corresponding to about 20-80% of the weldment thickness.

In order to prevent pick-up of metal from the workpieces 30, 31 onto the electrodes 10, 11, the tips 15 are coated with a layer or film 20, 21 of ceramic material. In the preferred embodiment shown, the layers 20, 21 comprise tungsten disulfide applied by chemical vapor deposition to a thickness of about 500-2000 angstroms. A particularly preferred ceramic layer has a thickness of approximately 1000 angstroms.

The ceramic layers 20, 21 may be applied to the weld tips 15 in relatively pure form or in various mixtures with each other. If desired, a solid lubricant such as graphite may be added to reduce friction. Electrical conductivity is enhanced in some instances by adding a dopant. For example, titanium diboride doped with boron is known to have better electrical conductivity than titanium diboride alone.

While the invention has been described in terms of preferred embodiments, the claims appended hereto are intended to encompass all embodiments which fall within the spirit of the invention.

What is claimed is:

1. A resistance welding electrode comprising:
   (a) a metal body defining a tip having an outer surface which abuts against a metal workpiece during welding; and
   (b) a coating on at least a portion of said outer surface, said coating comprising a layer of a ceramic material having a thickness of about 5000 angstroms or less, said ceramic material being selected from the group consisting of a sulfide of tungsten, titanium, molybdenum, or zirconium; a silicide of tentalum or vanadium; and a boride of hafnium, titanium, vanadium, or zirconium.

2. The resistance welding electrode of claim 1 wherein said ceramic material is selected from the group consisting of disulfides of tungsten, titanium, molybdenum, and zirconium; disilicides of tantalum and vanadium; and diborides of hafnium, titanium, vanadium, and zirconium.

3. The resistance welding electrode of claim 1 wherein said ceramic material comprises tungsten disulfide, titanium disulfide or molybdenum disulfide.

4. The resistance welding electrode of claim 1 wherein said ceramic material comprises tungsten disulfide.

5. The resistance welding electrode of claim 1 wherein said layer has an electrical resistivity of about 16 microohm-cm or less at ambient temperature.

6. The resistance welding electrode of claim 1 wherein said layer has a thermal conductivity of greater than about 0.05 cal/cm-sec° C. at ambient temperature.

7. The resistance welding electrode of claim 1 wherein said layer has a thickness of about 500 to 2000 angstroms.

8. The resistance welding electrode of claim 1 wherein said layer is applied to the outer surface of said tip by chemical vapor deposition.

9. The resistance welding electrode of claim 1 wherein said metal body comprises copper or a copper alloy.

10. A resistance welding process for joining together adjacent metal workpieces comprising the steps of:
    (a) bringing together first and second metal workpieces so that said workpieces are in contact in a weld region;
    (b) abutting at least one of said workpieces with an outer surface of a resistance welding electrode tip, at least a portion of said outer surface being coated with a layer of a ceramic material having a thickness of about 5000 angstroms or less, said ceramic material being selected from the group consisting of a sulfide of tungsten, titanium, molybdenum, or zirconium; a silicide of tantalum or vanadium; and a boride of hafnium, titanium, vanadium, or zirconium; and
    (c) passing an electric current through said electrode tip and said workpieces in the weld region, thereby to fuse said workpieces together into a weldment having a joint site.

11. The process of claim 10 wherein said ceramic material is selected from the group consisting of disulfides of tungsten, titanium, molybdenum, and zirconium; disilicides of tantalum and vanadium; and diborides of hafnium, titanium, vanadium, and zirconium.

12. The process of claim 10 wherein ceramic material comprises tungsten disulfide.

13. The process of claim 10 wherein said layer has a thickness of about 500 to 2000 anstroms.

14. The process of claim 10 wherein said layer is applied to the outer surface of said tip by chemical vapor deposition.

15. The process of claim 10 wherein said electrode tip comprises copper or a copper alloy.

16. The process of claim 10 wherein each said metal workpieces comprise steel, iron, aluminum, or copper.

* * * * *